Oct. 7, 1924.
L. GILLIG ET AL
1,510,668
SLIDING WINDOW FOR AUTOMOBILE TOPS
Filed June 10, 1920   2 Sheets-Sheet 1
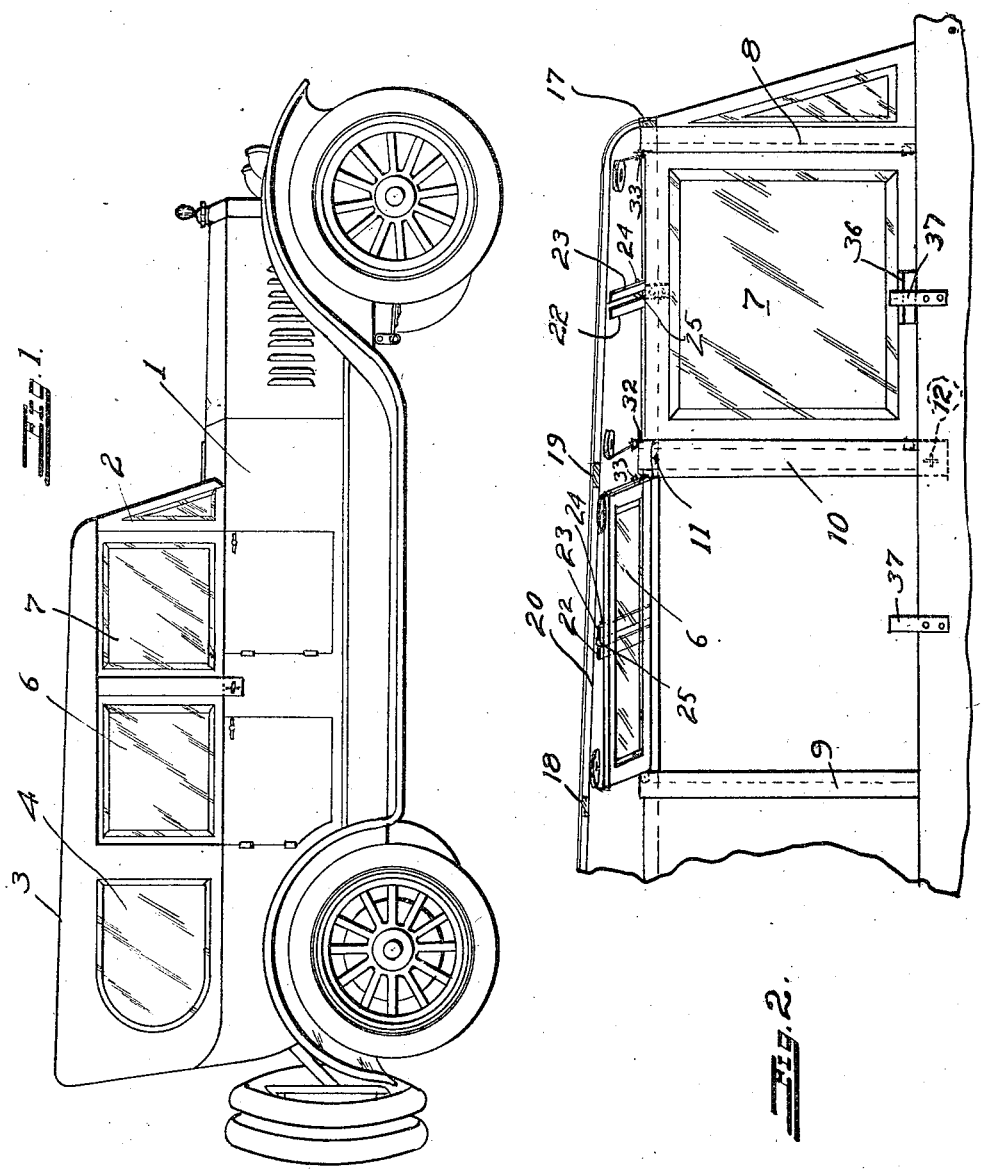
INVENTORS
Leo Gillig
Chester Gillig
BY Carlos P. Griffin
ATTORNEY.

Oct. 7, 1924.
L. GILLIG ET AL
1,510,668
SLIDING WINDOW FOR AUTOMOBILE TOPS
Filed June 10, 1920    2 Sheets-Sheet 2
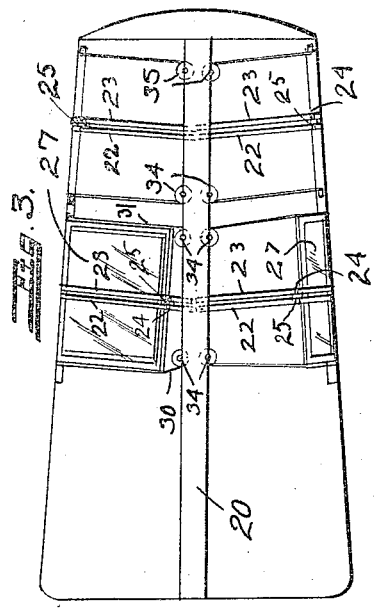
INVENTORS.
Leo Gillig
Chester Gillig
BY Carlos P. Griffin
ATTORNEY.

Patented Oct. 7, 1924.

1,510,668

UNITED STATES PATENT OFFICE.

LEO GILLIG AND CHESTER GILLIG, OF SAN FRANCISCO, CALIFORNIA.

SLIDING WINDOW FOR AUTOMOBILE TOPS.

Application filed June 10, 1920. Serial No. 387,965.

*To all whom it may concern:*

Be it known that we, LEO GILLIG and CHESTER GILLIG, citizens of the United States, residing at San Francisco, in the county of San Francisco, State of California, have invented new and useful Sliding Windows for Automobile Tops, of which the following is a specification, in such full and clear terms as will enable those skilled in the art to construct and use the same.

This invention relates to a sliding window for automobile bodies and its object is to provide a sliding window which will give the effect of a closed car or which can be moved to a position concealed under the automobile top at any time that it is desired to have the sides of the car open.

An object of the invention is to produce a series of guides which will enable the windows to be placed in position and operated with the least resistance and which will require the minimum fitting for the positioning of said guides.

It will be understood by those skilled in the art that most automobile bodies taper toward the front and that the top runs downwardly toward the front so that it is a comparatively difficult matter to place a series of guides under the automobile top to enable a rigid window to be used to enclose the sides of the car or to be moved to a concealed position under the top. With the present invention the window is supported at three points only. Three independent guides being used to direct the window to its desired position whereby much of the difficulty of fitting the window to the guides and fitting the guides to the car is eliminated, since two of the corners of the window are free to move up or down as may be necessary to place the window in the desired concealed position under the top and when the window is down it is securely held in the desired upright position both at top and bottom.

Another object of the invention is to produce a spring operated window which will be immediately restored to a position under the top when not in use upon the release of a latch which will hold the window down when that is desired.

Another object of the invention is to provide means for concealing the window which will permit the window to be raised to the concealed position and which will at once conceal the window without other effort upon the part of the driver.

Other objects of the invention will appear as the description proceeds.

An embodiment of the invention is shown in the accompanying drawings in which the same reference numeral is applied to the same portion throughout, but we are aware that there may be modifications thereof.

Figure 1 is a side elevation of an automobile having this window applied thereto.

Fig. 2 is a vertical sectional view of a portion of the top showing one window down and the other window raised.

Fig. 3 is a plan view of the automobile top showing the arrangement of the guide for the upper end of the sliding window.

Fig. 4 is a view of one of the windows and a portion of the top as it appears when being raised to the concealed position under the top.

Fig. 5 is a perspective view of one of the windows and a portion of the center window guide.

Fig. 6 is a plan view on a slightly enlarged scale of one of the spring drums.

The numeral 1 indicates the automobile body which has the wind shield front 2 and top 3. The present top is provided with a rear window 4 on each side and from the space at the front of the window 4 to the wind shield there are provided two of the present sliding windows as indicated at 6 and 7.

At the side of the wind shield there is a fixed guide 8 while on the front of the top support in front of the window 4, there is a fixed guide 9. Between the two slidable windows on each side of the car there is a pivoted double guide 10. This guide is pivoted at 11 and is detachable from the body side by means of the button 12, said button being of a common form used on automobile tops. Above the pivoted guide there is a fixed double guide 12, which enables the window slides 14 and 15 to move to a position out of the end of the guides in the bar 10 to enable the pivoted guide to be turned to a concealed position under the edge of the top, or if desired the screw 16 may be removed and the bar 10 may be entirely detached from the body and top when the window is placed in the concealed position.

The automobile top has a front bow 17 and such other intermediate bows 18 and 19 as are necessary to preserve the shape of the top, a longitudinal bar 20 being used at the center of the top and which bar extends rearwardly from the front bow 17 and is suitably connected with the bows 18 and 19. Supported from the under side of the bar 20 and connected with the outer rail 21 of the automobile top, which rail is an extension of the horizontally extending bow 17 are two plates 22 and 23 and for each of the four side windows, which plates form a guide for the pin 24 carried by a lug 25 on the upper edge of the window frame 26 at its center.

The window frame carries a glass or other transparent material central portion 27 and at its lower edge it has the rollers 14 and 15 secured to the window frame by means of pins 28 and 29. Also connected with the pins 28 and 29 are two cables 30 and 31, which cables pass over rollers 32 and 33 under the outer edge of the top and which pass around reels 34 and 35 at the center of the top, there being a pair of these spring reels for each of the four windows and one window being substantially the same in operation as all of the others. Spiral springs 32' are enclosed within the reels and operate them.

The window frame is provided with a brake 7 indicated at 36 to enable the driver to pull the window down readily and the door has a spring hook 37 to enable the window to be held down. Depending from the center rail 20 are four pairs of screw-eyes 38 and 39 which pivotally support a flexible cloth covered frame 40 for concealing the windows when they are raised under the top.

This cloth covered frame 40 is shaped to fit snugly against the upper edge of the windows when they are down and to permit the windows to slide up to their concealed position by simply moving down under the pressure brought to bear upon the windows by the spring drums 34 and 35. There is a frame 40 for each window.

In operation the driver pulls down one of the frames 40 enough to get hold of the lower edge of the window and pull it down until it is engaged by the catch 37.

When the window is to be raised, the catch 37 is released from the window frame whereupon the spring in the drums 34 and 35 will immediately snap the window up to its concealed position under the automobile top.

What we claim is as follows, but various modifications may be made in the construction shown in the drawings and above particularly described form, within the purview of our invention.

1. The combination with an automobile and its top, of a slidable window, a pair of guides connecting the top and car body, a single guide extending laterally upwardly and rearwardly from the side of the top toward the center thereof, lugs carried by the window slidable in each of said guides, cables passing over pulleys at the top of the side guides, said cables connected to the bottom corners of the window a spring winding drum to which each cable is connected, and springs under the top for winding said cables to aid in raising the window.

2. The combination with an automobile and its top, of a slidable window, a pair of guides connecting the top and car body, a single guide extending upwardly and rearwardly from the side of the top toward the center thereof, lugs carried by the window slidable in each of said guides, cables passing over pulleys at the top of the side guides, said cables connected to the bottom corners of the window, and a spring pressed enclosure for concealing the window when it is in the raised position under the top.

In testimony whereof we have hereunto set our hands this 2nd day of June, A. D. 1920.

LEO GILLIG.
CHESTER GILLIG.